United States Patent
Antani et al.

(10) Patent No.: US 10,120,897 B2
(45) Date of Patent: Nov. 6, 2018

(54) INTERCEPTION OF DATABASE QUERIES FOR DELEGATION TO AN IN MEMORY DATA GRID

(75) Inventors: Snehal S. Antani, Hyde Park, NY (US); Kulvir S. Bhogal, Pflugerville, TX (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1725 days.

(21) Appl. No.: 13/154,407

(22) Filed: Jun. 6, 2011

(65) Prior Publication Data

US 2012/0310992 A1    Dec. 6, 2012

(51) Int. Cl.
*G06F 17/30*    (2006.01)
*G06F 17/00*    (2006.01)

(52) U.S. Cl.
CPC .............................. *G06F 17/30445* (2013.01)

(58) Field of Classification Search
CPC ......... G06F 17/30286; G06F 17/30483; G06F 17/30528; G06F 17/30306; G06F 17/30445; G06F 9/466; G06F 9/5072; G06F 9/5083
USPC ............. 707/769, 607; 714/10, 18; 711/162; 712/29; 709/216
See application file for complete search history.

(56) References Cited

U.S. PATENT DOCUMENTS

| | | | |
|---|---|---|---|
| 6,167,438 A * | 12/2000 | Yates et al. | 709/216 |
| 6,185,598 B1 * | 2/2001 | Farber et al. | 709/200 |
| 6,330,605 B1 * | 12/2001 | Christensen et al. | 709/226 |
| 7,680,771 B2 * | 3/2010 | Cialini et al. | 707/999.003 |
| 8,719,242 B2 * | 5/2014 | Theobald | G06F 17/3041 707/705 |
| 9,032,017 B1 * | 5/2015 | Singh | G06F 17/30194 709/203 |
| 2005/0278276 A1 | 12/2005 | Andreev et al. | |
| 2006/0136448 A1 | 6/2006 | Cialini et al. | |
| 2007/0089107 A1 | 4/2007 | Squires et al. | |
| 2007/0250835 A1 | 10/2007 | Kobayashi et al. | |
| 2010/0153963 A1 | 6/2010 | Kakarlamudi et al. | |

(Continued)

FOREIGN PATENT DOCUMENTS

| | | |
|---|---|---|
| CN | 1791113 | 6/2006 |
| CN | 101945100 | 1/2011 |

OTHER PUBLICATIONS

Shalom,Nati, "Scaling Out MySQL," natishalom.typepad.com, Mar. 29, 2008.

*Primary Examiner* — Yicun Wu
(74) *Attorney, Agent, or Firm* — Steven M. Greenberg, Esq.; CRGO Law

(57) ABSTRACT

Embodiments of the present invention provide a method, system and computer program product for the seamless integration of an application with an in memory data grid. In an embodiment of the invention, a method for intercepting database queries from a computer program for delegation to an in memory data grid is provided. The method includes retrieving database queries from a database driver for a database management system from a requesting computer program and comparing at least a portion of each of the database queries to a listing of database queries. Thereafter, the database queries are selectively routed to a data grid, such as an in memory data grid, in lieu of the database management based upon the comparison.

13 Claims, 2 Drawing Sheets

(56) References Cited

U.S. PATENT DOCUMENTS

| | | |
|---|---|---|
| 2011/0010379 A1 | 1/2011 | Gilderman et al. |
| 2011/0040830 A1 | 2/2011 | Kumar et al. |
| 2011/0041006 A1* | 2/2011 | Fowler .......................... 714/10 |
| 2012/0158723 A1* | 6/2012 | Wu .................. G06F 17/30545 |
| | | 707/737 |

* cited by examiner

INTERCEPTION OF DATABASE QUERIES FOR DELEGATION TO AN IN MEMORY DATA GRID

BACKGROUND OF THE INVENTION

Field of the Invention

The present invention relates to grid computing and more particularly to database query processing within an in memory data grid.

Description of the Related Art

Grid computing refers to the use of the computing resources of multiple different computers in a computer communications network to a single computational problem concurrently. Grid computing provides substantial advantage when addressing scientific or technical problems that require a great number of computer processing cycles or access to large amounts of data. Generally, grid computing requires the use of computer program logic enabled to divide a computational problem into management and independently computable problem subsets, and to assign those subsets to as many computing resources in as many computers as required and available. To many, grid computing is thought of as distributed and large-scale cluster computing and as a form of network-distributed parallel processing.

A data grid, in contrast, to a computational grid includes a system composed of multiple servers that work together to manage information and related operations in a distributed environment. An "in memory" data grid, in turn, is a data grid that stores the information in memory in order to achieve very high performance, and uses redundancy—by keeping copies of that information synchronized across multiple servers—in order to ensure the resiliency of the system and the availability of the data in the event of server failure. An in memory data grid achieves low response times for data access by maintaining stored information in memory and in an application object form, and by sharing that information across multiple servers. In other words, applications may be able to access required information without any network communication and without any data transformation step such as an object relational mapping.

When considering adoption of an in memory data grid, adopters consider as a major obstacle the need to modify applications to 'talk' to the data grid. In this regard, these applications are typically coded to interface with a database by way of querying according to a known interface, and modifying applications to respect a grid as opposed to a database can be an expensive proposition. An alternative approach includes the creation of stored procedures to interrogate a data grid as opposed to a database. Even still, the stored procedure approach still requires the modification of the underlying application.

BRIEF SUMMARY OF THE INVENTION

Embodiments of the present invention address deficiencies of the art in respect to data grid integration and provide a novel and non-obvious method, system and computer program product for the seamless integration of an application with an in memory data grid. In an embodiment of the invention, a method for intercepting database queries from a computer program for delegation to an in memory data grid is provided. The method includes retrieving database queries from a database driver for a database management system from a requesting computer program and comparing at least a portion of each of the database queries to a listing of database queries. Thereafter, the database queries are selectively routed to a data grid, such as an in memory data grid, in lieu of the database management based upon the comparison.

In an aspect of the embodiment, only those of the database queries that are included in the listing of database queries are routed to the data grid. Alternatively, in another aspect of the embodiment, only those of the database queries that are included in the listing of database queries are routed to the database management system. In yet another aspect of the embodiment, only those of the database queries that are included in the listing of database queries are routed to the data grid and only when the data grid is determined not have been contemporaneously utilized above a threshold level. Optionally, when the database queries are routed to the data grid, the database queries are provided to the data grid for handling by a correspondingly specified data grid handler in the listing of the database queries.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the interception of database queries from a computer program for delegation to an in memory data grid. In accordance with an embodiment of the invention, a database query from a computer program can be received in a database driver for a database communicatively coupled to the computer program. A determination can be made whether or not to route the database query to an in memory data grid in lieu of the database. If so, the database query can be routed to the in memory data grid in lieu of the database. Otherwise, the database query can be routed to the database and not the in memory data grid. In this way, the computer program can be integrated with the in memory data grid without requiring modification of the computer program itself.

Figure 1:
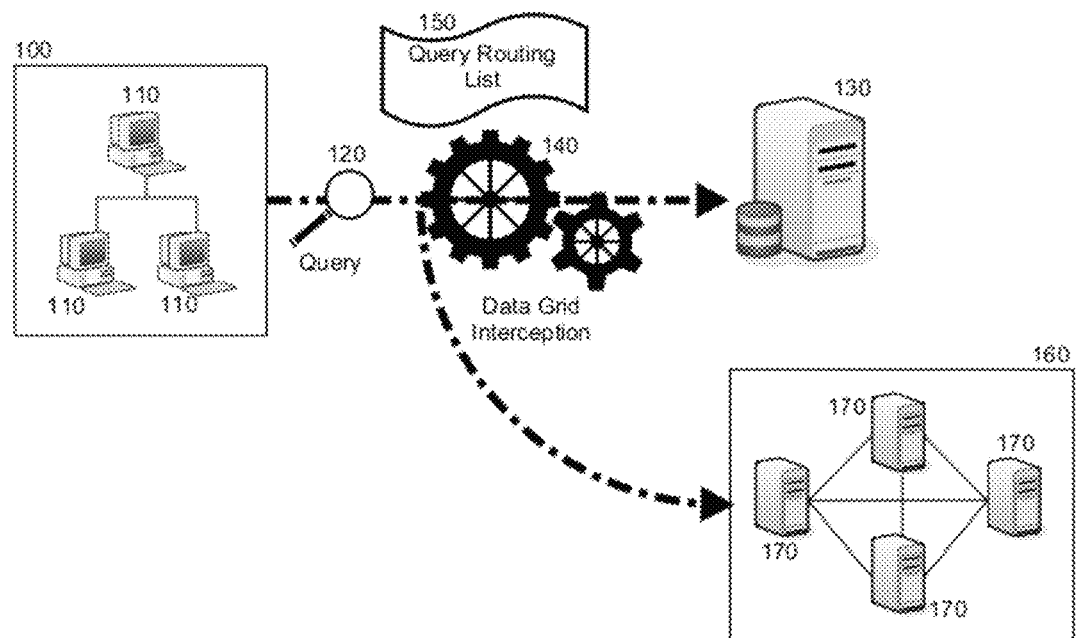
FIG. 1 is a pictorial illustration of a process for intercepting database queries from a computer program for delegation to an in memory data grid.

In further illustration, FIG. 1 pictorially shows a process for intercepting database queries from a computer program for delegation to an in memory data grid. As shown in FIG. 1, data grid interception logic 140 can be coupled both to a database management system 130 and also a data grid 160 of different data storage resources 170. The data grid interception logic 140 can receive database queries 120 from one or more computer programs 110 in a host computing environment 100. The data grid interception logic 140 can compare one or more portions of each of the queries 120 to a query routing list 150 to determine whether or not each of the queries 120 is to be routed to the database management system 130, or the data grid 160. In the latter instance, a fetch routine for the data grid 160 can be determined from the query routing list.

Figure 2:
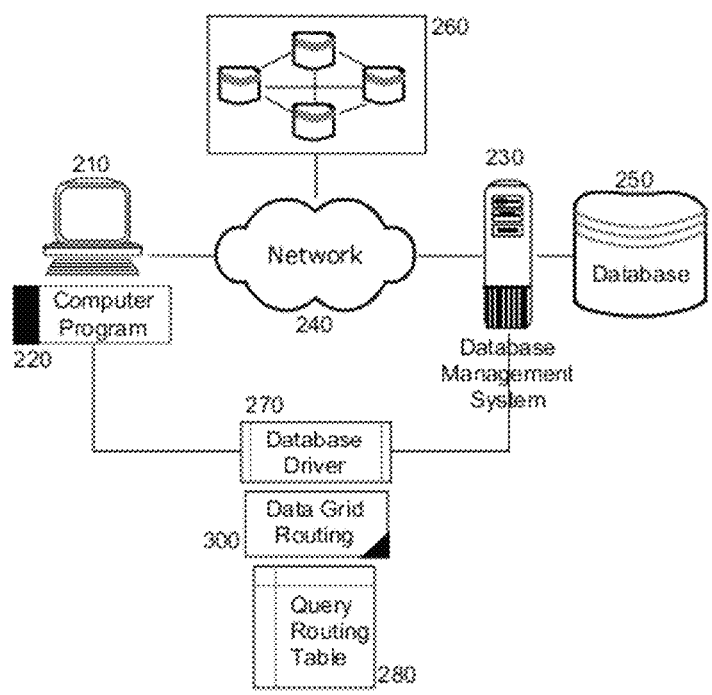
FIG. 2 is a schematic illustration of a data processing system configured for intercepting database queries from a computer program for delegation to an in memory data grid; and, FIG. 3 is a flow chart illustrating a process for intercepting database queries from a computer program for delegation to an in memory data grid.

The process described in connection with FIG. 1 can be implemented in a data processing system. In yet further illustration, FIG. 2 schematically shows a data processing system configured for intercepting database queries from a computer program for delegation to an in memory data grid. The system can include a host computer 210 communicatively coupled to a database management system 230 over computer communications network 240. The database management system 230 can provide functionality operable to access data stored in a database 250.

The host computer 210 can include at least one processor and memory and can support the execution of one or more computer programs 220 (only a single computer program shown for the purpose of illustrative simplicity). A database driver 270 can be logically coupled to the computer program 220 either as part of the computer program 220 executing in the memory of the host computer 210, or remotely over an interprocess communications linkage. The database driver 270 can provide an interface to the computer program 220 for performing query operations on data in the database 250 in the database management system 230.

Of note, data grid routing module 300 can be coupled to the database driver 270. The data routing module 300 can include program code that when executed by a processor of a computer, is operable to compare at least a portion of a database query received in the database driver 270 to a list of database queries in query routing table 280. More particularly, the list of database queries in query routing table 280 can represent a listing of queries that have been a priori determined for routing onto a data grid 260, for example an in memory data grid, instead of to the database management system 230. The data routing module 300 can include additional program code that when executed by a processor of a computer, is operable to route a received database query received in the database driver 270 to the data grid 260 in lieu of the database management system 230 when the received database query is determined to have been listed in the query routine table 280.

Figure 3:
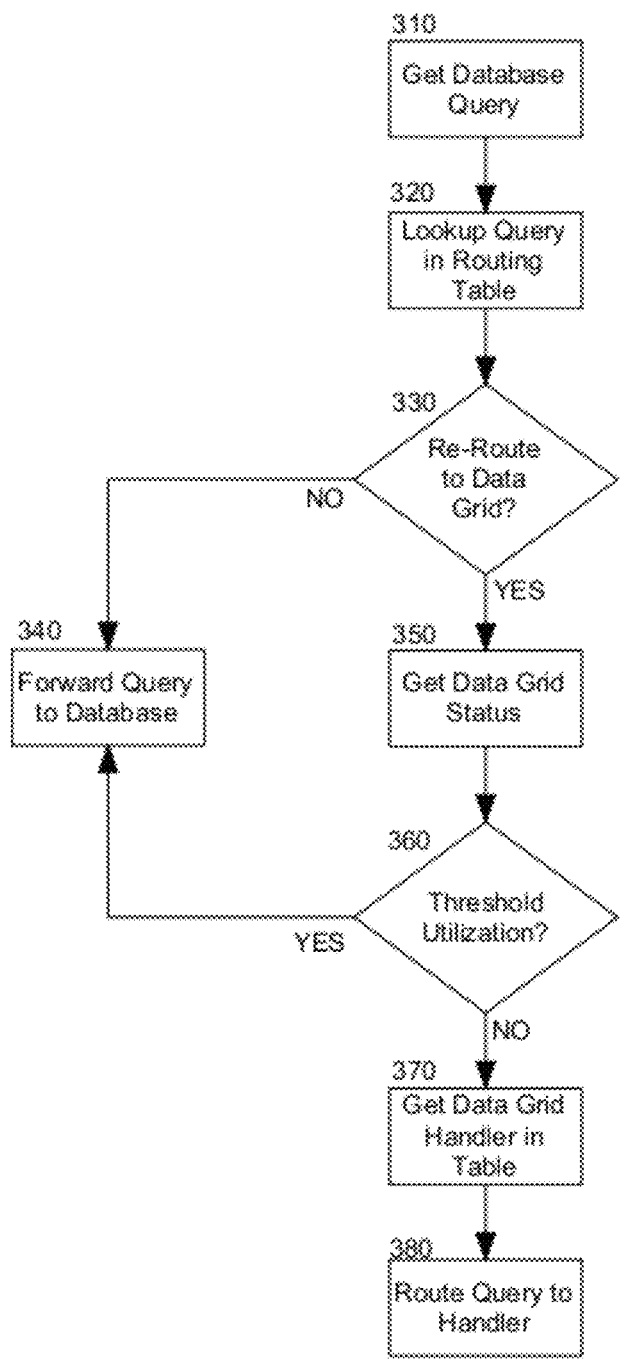

In even yet further illustration of the operation of the data grid routing module 300, FIG. 3 is a flow chart illustrating a process for intercepting database queries from a computer program for delegation to an in memory data grid. Beginning in block 310, a database query can be retrieved from the database driver. In block 320, at least one portion of the database query can be compared to a listing of queries in the routing table. In decision block 330, it can be determined whether to route the database query to the database management system for satisfaction, or to the data grid for satisfaction. In the former instance, in block 340 the database query can be routed to the database management system.

In the latter instance, in block 350 the operational status of the data grid can be determined—namely the degree to which the data grid has been utilized contemporaneously. In decision block 360, if the data grid is determined to have been contemporaneously utilized beyond a threshold level, in block 340 the database query can be routed to the database management system though the database query had been determined a prior to be routed to the data grid. However, if the data grid is determined to have not been contemporaneously utilized beyond a threshold level, in block 370 a data grid handler can be selected for the database query from the routing table. Subsequently, in block 380 the database query can be routed to the selected data grid handler for satisfaction by the data grid in lieu of the database management system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for intercepting database queries from a computer program for delegation to an in memory data grid, the method comprising:
    enabling a client database driver for a database management system to delegate database queries from interfacing with a database to interfacing with an in memory data grid;
    retrieving database queries from the enabled client database driver from a requesting computer program;
    comparing at least a portion of each of the retrieved database queries to a listing of database queries that have been a priori determined for routing onto the in memory data grid; and,
    selectively delegating the retrieved database queries to the in memory data grid in lieu of the database management system based upon the comparison and on condition that one of the retrieved database queries is delegated to the in memory data grid in lieu of the database management system, determining a fetch routine from the query routing list from the listing of database queries.

2. The method of claim 1, wherein the client database driver is a Java Database Connectivity (JDBC) driver.

3. The method of claim 1, wherein the database driver is included as part of the computer program.

4. The method of claim 1, wherein selectively routing the database queries to a data grid in lieu of the database management based upon the comparison, comprises routing to the data grid only those of the database queries that are included in the listing of database queries.

5. The method of claim 1, wherein selectively routing the database queries to a data grid in lieu of the database management based upon the comparison, comprises routing to the database management system only those of the database queries that are included in the listing of database queries.

6. The method of claim 1, wherein selectively routing the database queries to a data grid in lieu of the database management based upon the comparison, comprises routing to the data grid only those of the database queries that are included in the listing of database queries and only when the data grid is determined not have been contemporaneously utilized above a threshold level.

7. The method of claim 1, wherein selectively routing the database queries to a data grid in lieu of the database management based upon the comparison, comprises routing to the data grid only those of the database queries that are included in the listing of database queries using a correspondingly specified data grid handler in the listing of the database queries.

8. A method for use with a client database driver that selectively forwards incoming database queries to one of the following recipient components:
  a database or an in memory data grid, the method comprising:
  receiving, by the client database driver, a grid eligible query type data set including information indicative of query types that are eligible to be sent to the in memory data grid instead of to the database;
  receiving, by the client database driver, a new database query;
  determining, by the client database driver and based upon the grid eligible query type data set, that the new database query is of a query type such that the new database query is a grid-eligible database query that is eligible to be sent to the in memory data grid;
  responsive to the determination that the new database query is a grid-eligible query, determining, by the client database driver, a utilization level value of the in memory data grid;
  comparing, by the client database driver, the utilization level value of the in memory data grid to a predetermined threshold value to determine that the utilization level value is higher than the predetermined threshold value; and
  responsive to the determination that the utilization level value is higher than the threshold value, forwarding, by the client database driver, the grid-eligible database query to the database instead of to the in memory data grid.

9. The method of claim 8, wherein the grid eligible query type data set includes a grid handler.

10. The method of claim 8, further comprising:
  receiving, by client database driver, over a communication network and from the database, query results; and
  forwarding, by client database driver, over a communication network and to a requesting device, the query results.

11. A method for use with a client database driver that selectively forwards incoming database queries to one of the following recipient components: a database or an in memory data grid, the method comprising:
  receiving, by the client database driver, a grid eligible query type data set including information indicative of query types that are eligible to be sent to the in memory data grid instead of to the database;
  receiving, by the client database driver, a new database query;
  determining, by the client database driver and based upon the grid eligible query type data set, that the new database query is of a query type such that the new database query is a grid-eligible database query that is eligible to be sent to the in memory data grid;
  responsive to the determination that the new database query is a grid-eligible query, determining, by the client database driver, a utilization level value of the in memory data grid;
  comparing, by the client database driver, the utilization level value of the in memory data grid to a predetermined threshold value to determine that the utilization level value is lower than the predetermined threshold value; and
  responsive to the determination that the utilization level value is lower than the predetermined threshold value, forwarding, by the client database driver, the grid-eligible database query to the in memory data grid instead of to the database.

12. The method of claim 11, wherein the grid eligible query type data set includes a grid handler.

13. The method of claim 11, further comprising:
  receiving, by client database driver, over a communication network and from the in memory data grid, query results; and
  forwarding, by client database driver, over a communication network and to a requesting device, the query results.

* * * * *